United States Patent
Agarwal et al.

(10) Patent No.: US 11,716,283 B2
(45) Date of Patent: Aug. 1, 2023

(54) METHODS, SYSTEMS, AND COMPUTER READABLE MEDIA FOR SELECTING A SOFTWARE DEFINED WIDE AREA NETWORK (SD-WAN) LINK USING NETWORK SLICE INFORMATION

(71) Applicant: Oracle International Corporation, Redwood Shores, CA (US)

(72) Inventors: Gaurav Agarwal, Tyngsboro, MA (US); Anup Shivarajapura, Bangalore (IN); Raghuvamshi vasudev Singh Thakur, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/193,350

(22) Filed: Mar. 5, 2021

(65) Prior Publication Data
US 2022/0286391 A1  Sep. 8, 2022

(51) Int. Cl.
*H04L 12/741* (2013.01)
*H04L 45/74* (2022.01)
*H04L 12/46* (2006.01)

(52) U.S. Cl.
CPC .......... *H04L 45/74* (2013.01); *H04L 12/4641* (2013.01)

(58) Field of Classification Search
CPC .......... H04L 12/4641; H04W 28/0268; H04W 48/16; H04W 92/02
See application file for complete search history.

(56) References Cited

U.S. PATENT DOCUMENTS 8,125,907 B2   2/2012  Averi et al.
8,274,891 B2   9/2012  Averi et al.
(Continued)

FOREIGN PATENT DOCUMENTS

CN    109600262 A    4/2019
EP    2 963 866 A2   1/2016
(Continued)

OTHER PUBLICATIONS

Notice of Allowance and Fee(s) Due for U.S. Appl. No. 16/676,006 (dated Aug. 9, 2021).
(Continued)

*Primary Examiner* — Mansour Oveissi
(74) *Attorney, Agent, or Firm* — Jenkins, Wilson, Taylor & Hunt, P.A.

(57) ABSTRACT

Methods, systems, and computer readable media for selecting a software defined wide area network (SD-WAN) link using network slice information are disclosed. One method occurs at an SD-WAN controller implemented using at least one processor, the method comprises: receiving a packet containing packet header information including at least one internet protocol (IP) address; determining, using the packet header information, a link selection rule for selecting an SD-WAN link for transmission, wherein the link selection rule uses transmission characteristics associated with the packet, wherein the transmission characteristics are discerned using network slice information associated with the packet; selecting, using the link selection rule, the SD-WAN link; and transmitting the packet via the SD-WAN link.

17 Claims, 7 Drawing Sheets

(56) References Cited

U.S. PATENT DOCUMENTS

| | | | |
|---|---|---|---|
| 8,452,846 B2 | 5/2013 | Fredette et al. | |
| 8,775,547 B2 | 7/2014 | Fredette et al. | |
| 9,069,727 B2 | 6/2015 | Martin et al. | |
| 9,100,338 B2 | 8/2015 | Averi et al. | |
| 9,392,061 B2 | 7/2016 | Fredette et al. | |
| 9,407,557 B2 | 8/2016 | Wadkins et al. | |
| 9,455,778 B1 | 9/2016 | Wang et al. | |
| 10,362,507 B2 | 7/2019 | Dao | |
| 10,420,016 B2 | 9/2019 | Ryu et al. | |
| 10,448,239 B2 | 10/2019 | Faccin et al. | |
| 10,524,166 B2 | 12/2019 | Youn et al. | |
| 11,082,304 B2 | 8/2021 | Parsons et al. | |
| 11,115,327 B2 | 9/2021 | Spraggins et al. | |
| 11,197,176 B2 | 12/2021 | Pokkunuri et al. | |
| 11,405,931 B2 | 8/2022 | Gupta | |
| 2004/0083287 A1 | 4/2004 | Gao et al. | |
| 2006/0274760 A1 | 12/2006 | Loher | |
| 2007/0217436 A1 | 9/2007 | Markley et al. | |
| 2009/0197597 A1 | 8/2009 | Kotecha | |
| 2011/0222549 A1 | 9/2011 | Connelly et al. | |
| 2012/0320827 A1 | 12/2012 | Zhao et al. | |
| 2015/0071067 A1 | 3/2015 | Martin et al. | |
| 2015/0085663 A1 | 3/2015 | McMurry et al. | |
| 2015/0142940 A1 | 5/2015 | McMurry et al. | |
| 2015/0149656 A1 | 5/2015 | McMurry et al. | |
| 2015/0215228 A1 | 7/2015 | McMurry | |
| 2015/0381493 A1 | 12/2015 | Bansal et al. | |
| 2016/0065465 A1 | 3/2016 | Kennedy | |
| 2016/0164750 A1 | 6/2016 | Holkkola | |
| 2016/0179850 A1 | 6/2016 | Martin et al. | |
| 2016/0182305 A1 | 6/2016 | Martin et al. | |
| 2016/0182319 A1 | 6/2016 | Martin et al. | |
| 2016/0182327 A1 | 6/2016 | Coleman, Jr. et al. | |
| 2016/0197802 A1 | 7/2016 | Schultz et al. | |
| 2016/0218947 A1 | 7/2016 | Hughes et al. | |
| 2016/0315808 A1 | 10/2016 | Saavedra | |
| 2016/0315809 A1 | 10/2016 | McMurry et al. | |
| 2017/0048190 A1 | 2/2017 | McCann | |
| 2017/0048703 A1 | 2/2017 | McCann | |
| 2017/0048704 A1 | 2/2017 | McCann | |
| 2017/0085486 A1 | 3/2017 | Chung et al. | |
| 2017/0155590 A1 | 6/2017 | Dillon et al. | |
| 2017/0289027 A1 | 10/2017 | Ratnasingham | |
| 2017/0303259 A1 | 10/2017 | Lee et al. | |
| 2017/0324629 A1 | 11/2017 | Iyer et al. | |
| 2017/0332421 A1 | 11/2017 | Sternberg et al. | |
| 2017/0345281 A1 | 11/2017 | Shaw | |
| 2018/0013556 A1 | 1/2018 | Saavedra | |
| 2018/0123932 A1 | 5/2018 | Shaw et al. | |
| 2018/0139670 A1 | 5/2018 | Shaw et al. | |
| 2018/0159758 A1 | 6/2018 | Waizel | |
| 2018/0167983 A1 | 6/2018 | Salkintzis | |
| 2018/0227223 A1 | 8/2018 | Hughes | |
| 2018/0249281 A1 | 8/2018 | McCann | |
| 2018/0249282 A1 | 8/2018 | McCann | |
| 2018/0316564 A1 | 11/2018 | Senarath | |
| 2018/0317121 A1 | 11/2018 | Liao et al. | |
| 2018/0317134 A1 | 11/2018 | Leroux et al. | |
| 2018/0317163 A1 | 11/2018 | Lee et al. | |
| 2018/0332523 A1 | 11/2018 | Faccin et al. | |
| 2018/0343316 A1 | 11/2018 | Meyer et al. | |
| 2019/0036813 A1 | 1/2019 | Shenoy et al. | |
| 2019/0036816 A1 | 1/2019 | Evans et al. | |
| 2019/0052558 A1 | 2/2019 | Mehta et al. | |
| 2019/0058533 A1 | 2/2019 | Ghosh et al. | |
| 2019/0058656 A1 | 2/2019 | Gundersen et al. | |
| 2019/0124181 A1 | 4/2019 | Park et al. | |
| 2019/0141606 A1 | 5/2019 | Qiao et al. | |
| 2019/0207778 A1 | 7/2019 | Qiao et al. | |
| 2019/0222489 A1 | 7/2019 | Shan | |
| 2019/0268973 A1* | 8/2019 | Bull | H04W 28/0268 |
| 2019/0274038 A1 | 9/2019 | Wu et al. | |
| 2019/0274072 A1 | 9/2019 | Prasad et al. | |
| 2019/0280962 A1 | 9/2019 | Michael et al. | |
| 2019/0313359 A1 | 10/2019 | Lee et al. | |
| 2019/0335392 A1 | 10/2019 | Qiao et al. | |
| 2019/0356558 A1 | 11/2019 | Han et al. | |
| 2019/0357301 A1 | 11/2019 | Li et al. | |
| 2020/0029200 A1 | 1/2020 | Yu et al. | |
| 2020/0044943 A1 | 2/2020 | Bor-Yaliniz et al. | |
| 2020/0053617 A1 | 2/2020 | Park et al. | |
| 2020/0195557 A1* | 6/2020 | Duan | H04L 45/04 |
| 2020/0228420 A1 | 7/2020 | Dao et al. | |
| 2020/0275359 A1 | 8/2020 | Bordeleau et al. | |
| 2020/0313983 A1* | 10/2020 | Stammers | H04L 41/40 |
| 2020/0314701 A1 | 10/2020 | Talebi Fard et al. | |
| 2020/0351766 A1 | 11/2020 | Young | |
| 2020/0382387 A1* | 12/2020 | Pasupathy | H04L 43/091 |
| 2020/0396678 A1 | 12/2020 | Lee et al. | |
| 2021/0014170 A1 | 1/2021 | Huang et al. | |
| 2021/0021494 A1* | 1/2021 | Yao | H04L 43/06 |
| 2021/0051070 A1 | 2/2021 | Akman et al. | |
| 2021/0105638 A1 | 4/2021 | Al-Kanani et al. | |
| 2021/0112404 A1 | 4/2021 | Xin et al. | |
| 2021/0136602 A1 | 5/2021 | Pokkunuri et al. | |
| 2021/0136715 A1* | 5/2021 | Jeong | H04W 28/0289 |
| 2021/0185695 A1 | 6/2021 | Gupta et al. | |

FOREIGN PATENT DOCUMENTS

| | | |
|---|---|---|
| EP | 4035339 A1 | 8/2022 |
| EP | 4055852 A1 | 9/2022 |
| EP | 4074093 | 10/2022 |
| JP | 2022-550356 A | 12/2022 |
| JP | 2023-500931 A | 1/2023 |
| WO | WO 2017/032280 A1 | 3/2017 |
| WO | WO-2018/042459 A1 | 3/2018 |
| WO | WO 2018/170135 A1 | 9/2018 |
| WO | WO 2019/154295 A1 | 8/2019 |
| WO | WO 2019/158737 A1 | 8/2019 |
| WO | WO 2019/158777 A1 | 8/2019 |
| WO | WO 2019/197883 A1 | 10/2019 |
| WO | WO 2020/040957 | 2/2020 |
| WO | WO-2021/061581 | 4/2021 |
| WO | WO 2021/091623 A1 | 5/2021 |
| WO | WO 2021/119216 A1 | 6/2021 |

OTHER PUBLICATIONS

Final Office Action for U.S. Appl. No. 16/712,973 (dated Jul. 30, 2021).

Applicant-Initiated Interview Summary for U.S. Appl. No. 16/712,973 (dated May 3, 2021).

Non-Final Office Action for U.S. Appl. No. 16/676,006 (dated Apr. 8, 2021).

Notification of Transmittal of the International Search Report and the Written Opinion of the International Searching Authority, or the Declaration for International Application No. PCT/US2020/064137 (dated Mar. 18, 2021).

Non-Final Office Action for U.S. Appl. No. 16/712,973 (dated Nov. 23, 2020).

Commonly-assigned, co-pending U.S. Appl. No. 16/712,973 for "Methods, Systems, and Computer Readable Media for Providing for Network Slice Management Using Feedback Mechanism," (Unpublished, filed Dec. 12, 2019).

Commonly-assigned, co-pending U.S. Appl. No. 16/676,006 for "Methods, Systems, and Computer Readable Media for Providing for Policy-Based Access and Mobility Management Function (AMF) Selection Using Network Slice Selection Assistance Information (NSSAI) Availability Information," (Unpublished, filed Nov. 6, 2019).

"3rd Generation Partnership Project; Technical Specification Group Core Network and Terminals; 5G System; Network Function Repository Services; Stage 3 (Release 16)," 3GPP TS 29.510, V16.1.1, pp. 1-150 (Oct. 2019).

"3rd Generation Partnership Project; Technical Specification Group Services and System Aspects; Management and orchestration; Provisioning; (Release 16)," 3GPP TS 28.531, V16.3.0, pp. 1-70 (Sep. 2019).

(56) References Cited

OTHER PUBLICATIONS

"3rd Generation Partnership Project; Technical Specification Group Core Network and Terminals; 5G System; Network Data Analytics Services; Stage 3 (Release 16)," 3GPP TS 29.520, V16.1.0, pp. 1-54 (Sep. 2019).
"3rd Generation Partnership Project; Technical Specification Group Services and System Aspects; Procedures for the 5G System (5GS); Stage 2 (Release 16)," 3GPP TS 23.502, V16.2.0, pp. 1-525 (Sep. 2019).
"3rd Generation Partnership Project; Technical Specification Group Services and System Aspects; System Architecture for the 5G System (5GS) Stage 2 (Release 16)," 3GPP TS 23.501, V16.2.0, pp. 1-391 (Sep. 2019).
"3rd Generation Partnership Project; Technical Specification Group Services and System Aspects; Study of Enablers for Network Automation for 5G (Release 16)," 3GPP TR 23.791, V16.2.0, pp. 1-124 (Jun. 2019).
"Oracle® Communications Network Slice Selection Function (NSSF) Cloud Native User's Guide," Oracle, Release 1.0, F16990-01, pp. 1-29 (Apr. 2019).
"3rd Generation Partnership Project; Technical Specification Group Services and System Aspects; Telecommunication management; Study on management and orchestration of network slicing for next generation network (Release 15)," 3GPP TR 28.801, V15.1.0, pp. 1-75 (Jan. 2018).
Mannweiler, "5G Mobile Network Architecture for diverse services, use cases, and applications in 5G and beyond Deliverable D2.2 Initial overall architecture and concepts for enabling innovations," H2020-ICT-2016-2, 5G-MoNArch, Project No. 761445, pp. 1-111 (2018).
Barmpounakis et al., "Data Analytics for 5G Networks: A Complete Framework for Network Access Selection and Traffic Steering," International Journal on Advances in Telecommunications, vol. 11, No. 3 & 4, pp. 101-114 (2018).
Saboorian et al., "Network Slicing and 3GPP Service and Systems Aspects (SA) Standard," IEEE Software Defined Networks, pp. 1-7 (Dec. 2017).
Foy et al., "Network Slicing—3GPP Use Case draft-defoy-netslices-3gpp-network-slicing-02," Network Working Groups, pp. 1-14 (Oct. 16, 2017).
Rapporteurs and Volunteers, "5GS Open Topics Collection for SA2#122," 3GPP Draft; S2-174251 5GS-Status Track-Open Topics-V5 1 3, 3rd Generation Partnership Project (3GPP), vol. SA WG2, pp. 1-12, (May 15-19, 2017).
"3rd Generation Partnership Project; Technical Specification Group Core Network and Terminals; 5G System; Network Slice Selection Services; Stage 3 (Release 16)," 3GPP TS 29.531, VCT WG4, No. V16.0.0, pp. 1-53 (Sep. 23, 2019).
International Search Report and Written Opinion for International Patent Application No. PCT/US2020/051884, pp. 1-19, (dated Dec. 8, 2020).
Communication of European publication number and information on the application of Article 67(3) EPC for European Patent Application No. 19752615.5 (dated Jun. 2, 2021).
Notice of Allowance and Fee(s) Due for U.S. Appl. No. 16/402,214 (dated May 6, 2021).
Final Office Action and Examiner-Initiated Interview Summary for U.S. Appl. No. 16/402,214 (dated Feb. 23, 2021).
Non-Final Office Action for U.S. Appl. No. 16/402,214 (dated Nov. 9, 2020).
"Oracle Communications Session Border Controller", Oracle, pp. 1-9 (2015).
Notification of Transmittal of the International Search Report and the Written Opinion of the International Searching Authority, or the Declaration for International Application No. PCT/US2019/044435 (dated Oct. 10, 2019).
Notification Concerning Availability of the Publication of the International Application for International Patent Application Serial No. PCT/US2020/051882 (dated Apr. 1, 2021).
International Search Report and Written Opinion for International Patent Application Serial No. PCT/US2020/051882 (dated Dec. 11, 2020).
Commonly-assigned, co-pending U.S. Appl. No. 16/586,300 for "Methods, Systems, and Computer Readable Media for Providing a Multi-Tenant Software-Defined Wide Area Network (SD-WAN) Node," (Unpublished, filed Sep. 27, 2019).
"VMware SD-WAN Enables Managed WAN for Service Providers," VMware, Inc., pp. 1-4 (Apr. 2019).
"Virtual Networks Orchestration (VNO)," Nokia Networks, pp. 1-6 (2019).
"Managed SD-WAN: Challenges for Service Providers," Versa Networks, pp. 1-5 (2019).
"Sevone Partners with Versa Networks to Support Secure SD-WAN Deployments," Versa Networks, pp. 1-6 (2019).
"Accelerate Service Revenues with EdgeConnectSP," Silver Peak Systems, Inc., pp. 1-8 (2019).
"Shared Customer Premise Equipment (CPE) Deployment in Multi-Tenant Units," HCL Technologies Limited, pp. 1-4 (2019).
"Unity OrchestratorSP Intelligent automation software powering the Unity EdgeConnect SD-WAN platform," Silver Peak Systems, Inc., pp. 1-5 (2019).
"Streamline and Differentiate SD-WAN Service through Multi-Domain Service Orchestration," White Paper, BluePlanet, Ciena Corporation, pp. 1-7 (Dec. 2018).
"Juniper Networks Cloud CPE Solution," Juniper Networks, Inc., pp. 1-6 (Nov. 2018).
"Contrail SD-WAN Design & Architecture Guide," Juniper Networks, Inc., pp. 1-46 (2018).
Non-Final Office Action and Applicant-Initiated Interview Summary for U.S. Appl. No. 16/712,973 (dated Oct. 14, 2021).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Services and System Aspects; Management and orchestration; Concepts, use cases and requirements (Release 17)," 3GPP TS 28.530, V17.0.0, pp. 1-31 (Dec. 2020).
"3rd Generation Partnership Project; Technical Specification Group Services and System Aspects; Management and orchestration; Provisioning; (Release 16)," 3GPP TS 28.531, V16.8.0, pp. 1-72 (Dec. 2020).
"3rd Generation Partnership Project; Technical Specification Group Services and System Aspects; Management and orchestration; 5G Network Resource Model (NRM); Stage 2 and stage 3 (Release 17 )," 3GPP TS 28.541, V17.1.0, pp. 1-456 (Dec. 2020).
Notification of Transmittal of the International Search Report and the Written Opinion of the International Searching Authority, or the Declaration for International Application No. PCT/US2022/014081 (dated May 12, 2022).
Notice of Allowance for U.S. Appl. No. 16/712,973 (dated Mar. 9, 2022).
Communication of European Publication Number and Information on the Application of Article 67(3) EPC for European Patent Application Serial No. 20786379.6 (dated Jul. 6, 2022).
First Examination Report for Indian Application Serial No. 202247007060 (dated Aug. 16, 2022).
Communication of European Publication Number and Information on the Application of Article 67(3) EPC for European Patent Application Serial No. 20786649.2 (dated Aug. 18, 2022).
Examination Report for IN Patent Application Serial No. 202247026632 (dated Oct. 20, 2022).

\* cited by examiner

300

| SLICE UE IP ADDRESSES | SLICE TRANSMISSION CHARACTERISTICS (E.G., REQUIREMENTS) |
|---|---|
| UE IP RANGE 'A' | BANDWIDTH 'Y', JITTER 'X', APP LATENCY 'V' |
| UE IP RANGE 'B' | E2E LATENCY 'R' |
| UE IP RANGE 'C' | BANDWIDTH 'Y', JITTER 'X', |
| UE IP RANGE 'D' | E2E LATENCY 'S' |

FIG. 3

| LINK NAME | BANDWIDTH [UPLOAD (UL)/ DOWNLOAD (DL)] | LATENCY | LOSS | JITTER |
|---|---|---|---|---|
| LINK A | UL1/DL1 | LATENCY 1 | LOSS 1 | JITTER 1 |
| LINK B | UL2/DL2 | LATENCY 2 | LOSS 2 | JITTER 2 |
| LINK C | UL1/DL3 | LATENCY 2 | LOSS 1 | JITTER 3 |
| LINK D | UL2/DL1 | LATENCY 3 | LOSS 3 | JITTER 3 |

| PACKET HEADER INFORMATION | LINK SELECTION RULE | SELECTED SD-WAN LINK |
|---|---|---|
| SOURCE IP '5' DEST IP '1' | RULE 1 | LINK A |
| VLAN '2', DEST IP '1' | RULE 2 | LINK B |
| VLAN '4' | RULE 3 | LINK C |
| VLAN '2' DEST IP '2' | RULE 4 | LINK D |
| VLAN '1', DEST IP '1' | RULE 5 | LINK A |
| SOURCE IP '6' DEST IP '1' | RULE 6 | LINK B |
| SOURCE IP '5', DEST IP '2' | RULE 7 | LINK C |
| SOURCE IP '6', DEST IP '2' | RULE 8 | LINK D |
| VLAN '3' | RULE 9 | LINK A |
| VLAN '1' DEST IP '2' | RULE 10 | LINK C |

METHODS, SYSTEMS, AND COMPUTER READABLE MEDIA FOR SELECTING A SOFTWARE DEFINED WIDE AREA NETWORK (SD-WAN) LINK USING NETWORK SLICE INFORMATION

TECHNICAL FIELD

The subject matter described herein relates to software defined wide area networks (SD-WANs). More particularly, the subject matter described herein relates to methods, systems, and computer readable media for selecting an SD-WAN link using network slice information.

BACKGROUND

A wide area network (WAN) can be used to connect multiple sites, offices, and/or local area networks (LANs) for networking purposes. For example, an enterprise (e.g., a business or university) may have several branches or offices in multiple locations that need to connect to data centers and each other. In this example, the enterprise may use WAN links (e.g., leased telecommunications circuits and/or other techniques for physical and/or virtual connections like packet switching or circuit switching connections) to connect the various locations within the WAN and to maintain or achieve a desired service level (e.g., security, bandwidth, and/or latency requirements). WANs may use encryption and various network protocols when sending traffic via WAN links and, as such, various network nodes may be needed to route, process, and/or facilitate WAN related communications.

A software-defined WAN (SD-WAN) involves using software-defined networking (SDN) concepts to create and manage a WAN. For example, an SD-WAN may include a number of physical and/or virtual nodes or appliances that are programmable by a network controller for handling or facilitating WAN related communications. An SD-WAN may also utilize lower-cost and commercially available Internet access and related network equipment in lieu of more expensive WAN connection technologies and specialized equipment. While SD-WANs can be useful for connecting multiple sites in an effective and cost-efficient manner, issues can arise when attempting to select optimal or preferred SD-WAN links for different types of traffic. For example, depending on the type of traffic, some traffic (e.g., voice over internet protocol (VoIP) or video related packets) may need faster or more reliable SD-WAN links than other traffic (e.g., hypertext transfer protocol (HTTP) packets). While various algorithms exist that use deep packet inspection to select appropriate WAN links for various traffic flows, such algorithms may have unintended and/or negative effects on user experience and/or network performance, e.g., decreased throughput, increased packet latency, increases in dropped packets, etc.

SUMMARY

Methods, systems, and computer readable media for selecting a software defined wide area network (SD-WAN) link using network slice information are disclosed. One method occurs at an SD-WAN controller implemented using at least one processor, the method comprises: receiving a packet containing packet header information including at least one internet protocol (IP) address; determining, using the packet header information, a link selection rule for selecting an SD-WAN link for transmission, wherein the link selection rule uses transmission characteristics associated with the packet, wherein the transmission characteristics are discerned using network slice information associated with the packet; selecting, using the link selection rule, the SD-WAN link; and transmitting the packet via the SD-WAN link.

One example system for selecting an SD-WAN link using network slice information includes an SD-WAN controller comprising at least one processor. The SD-WAN controller is configured for: receiving a packet containing packet header information including at least one internet protocol (IP) address; determining, using the packet header information, a link selection rule for selecting an SD-WAN link for transmission, wherein the link selection rule uses transmission characteristics associated with the packet, wherein the transmission characteristics are discerned using network slice information associated with the packet; selecting, using the link selection rule, the SD-WAN link; and transmitting the packet via the SD-WAN link.

One example non-transitory computer readable medium comprising computer executable instructions embodied in the non-transitory computer readable medium that when executed by at least one processor of at least one computer cause the at least one computer to perform steps comprising: at an SD-WAN controller implemented using at least one processor: receiving a packet containing packet header information including at least one internet protocol (IP) address; determining, using the packet header information, a link selection rule for selecting an SD-WAN link for transmission, wherein the link selection rule uses transmission characteristics associated with the packet, wherein the transmission characteristics are discerned using network slice information associated with the packet; and selecting, using the link selection rule, the SD-WAN link for transmission.

According to an aspect of the subject matter described herein, prior to receiving a packet, an SD-WAN controller or a second entity communicatively coupled to the SD-WAN controller is configured for: subscribing, to a network slice manager, to receive notification for a network slice information provisioning data report via a subscribe managed object instance (MOI); after a network slice is created, receiving, from the network slice manager, the network slice information provisioning data report via a notify MOI, wherein the notify MOI includes network slice information; and using the network slice information to generate or update a record in a data store indicating an association between one or more IP addresses associated with the network slice and transmission characteristics associated with the network slice.

According to an aspect of the subject matter described herein, a data store comprises a plurality of records indicating associations between IP addresses and transmission characteristics, wherein each of the associations is based on a different network slice.

According to an aspect of the subject matter described herein, an SD-WAN controller or a second entity communicatively coupled to the SD-WAN controller is registered with a network slice manager as an authorized management service consumer.

According to an aspect of the subject matter described herein, a network slice manager includes a network slice management function (NSMF), a network slice subnet management function (NSSMF), a communication service management function (CSMF), or a fifth generation (5G) network function.

According to an aspect of the subject matter described herein, network slice information includes service profile information.

According to an aspect of the subject matter described herein, service profile information includes PerfReq attribute information, a data network name (DNN), a virtual local area network (VLAN) identifier (ID), an IP packet range, an upload bandwidth requirement, a download bandwidth requirement, an application latency requirement, an expected end-to-end latency requirement, a jitter requirement, an availability requirement, a reliability requirement, a data rate requirement, a payload size requirement, a traffic density requirement, a connection density requirement, or a service area dimension requirement.

According to an aspect of the subject matter described herein, determining a link selection rule includes performing shallow packet inspection of an IP header of the packet to obtain packet header information.

According to an aspect of the subject matter described herein, a packet for transmission via a selected SD-WAN link may be received from or originate from a 5G communications network.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits.

In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 3 is a diagram illustrating example service profile related information associated with a plurality of 5G network slices;

FIG. 4 is a diagram illustrating example SD-WAN link information;

FIG. 5 is a diagram illustrating example SD-WAN selection information;

DETAILED DESCRIPTION

Figure 1:
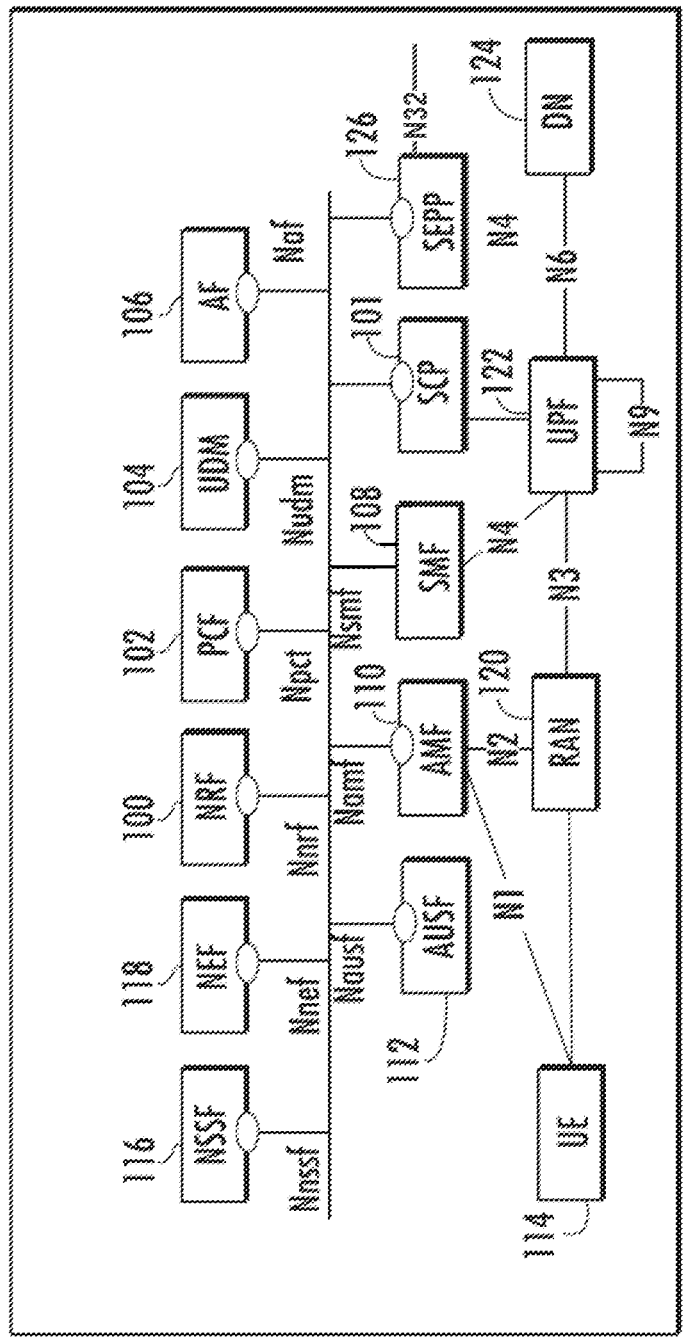
FIG. 1 is a network diagram illustrating an example fifth generation (5G) network architecture.

The subject matter described herein relates to methods, systems, and computer readable media for selecting a software defined wide area network (SD-WAN) link using network slice information. In 5G telecommunications networks, a network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of an internet protocol (IP) address and a port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

One example of an NF that provides services to user equipment (UE) devices, such as Internet of Things (IoT) devices, is the access and mobility management function or AMF. The AMF provides registration management, connection management, reachability management, mobility management, and other services for UE devices. The AMF serves as the point of contact between the radio access network and the remaining nodes in the 5G core network. The AMF also serves as the point of access to network slice services.

Network slicing is a service provided in 5G networks where network resources are logically allocated in portions or slices for use by UE devices. Each network slice may provide particular capabilities or services (e.g., transmission requirements such as bandwidth and latency requirements) to a UE. A network slice instance is defined as a set of network functions and the resources for the network functions which are arranged and configured to form and meet a specific set of network requirements. For example, a network slice instance for access network services may be resources of a virtualized g-Node B and AMF to provide access network services for a UE. A network slice instance for a core network service may include resources of a virtualized NRF and network exposure function (NEF) configured to provide core network services for a UE, such as an Internet of things (IoT) device.

In accordance with some aspects of the subject matter described herein, methods, systems, mechanisms, and/or techniques for selecting an SD-WAN link using network slice information are provided. For example, an SD-WAN controller in accordance with various aspects described herein can be configured for: receiving a packet containing packet header information including at least one IP address; determining, using the packet header information, a link selection rule for selecting an SD-WAN link for transmission, wherein the link selection rule uses transmission characteristics associated with the packet, wherein the transmission characteristics are discerned using network slice information associated with the packet; and selecting, using the link selection rule, the SD-WAN link for transmission.

In accordance with some aspects of the subject matter described herein, prior to receiving a packet, an SD-WAN controller or a second entity communicatively coupled to the SD-WAN controller is configured for: subscribing, to a network slice manager, to receive notification for a network slice information provisioning data report via a subscribe managed object instance (MOI); after a network slice is created, receiving, from the network slice manager, the network slice information provisioning data report via a notify MOI, wherein the notify MOI includes network slice information; and using the network slice information to generate or update a record in a data store indicating an association between one or more IP addresses associated with the network slice and transmission characteristics associated with the network slice.

In accordance with some aspects of the subject matter described herein, a data store comprises a plurality of records indicating associations between IP addresses and transmission characteristics, wherein each of the associations is based on a different network slice.

In accordance with some aspects of the subject matter described herein, an SD-WAN controller or a second entity communicatively coupled to the SD-WAN controller is registered with a network slice manager as an authorized management service consumer.

In accordance with some aspects of the subject matter described herein, a network slice manager includes a network slice management function (NSMF), a network slice subnet management function (NSSMF), a communication service management function (CSMF), or a fifth generation (5G) network function.

In accordance with some aspects of the subject matter described herein, network slice information includes service profile information.

In accordance with some aspects of the subject matter described herein, service profile information includes PerfReq attribute information, a data network name (DNN), a virtual local area network (VLAN) identifier (ID), an IP packet range, an upload bandwidth requirement, a download bandwidth requirement, an application latency requirement, an expected end-to-end latency requirement, a jitter requirement, an availability requirement, a reliability requirement, a data rate requirement, a payload size requirement, a traffic density requirement, a connection density requirement, or a service area dimension requirement.

In accordance with some aspects of the subject matter described herein, determining a link selection rule includes performing shallow packet inspection of an IP header of the packet to obtain packet header information.

In accordance with some aspects of the subject matter described herein, a packet for transmission via a selected SD-WAN link may be received from or originate from a 5G communications network.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture. Referring to FIG. 1, the depicted 5G system network architecture includes NRF 100 and SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF service profile is a JavaScript object notation (JSON) data structure defined in Third Generation Partnership Project (3GPP) Technical Specification (TS) 29.510. The NF service profile definition includes at least one of a fully qualified domain name (FQDN), an Internet protocol (IP) version 4 (IPv4) address or an IP version 6 (IPv6) address. In FIG. 1, any of the nodes (other than SCP 101) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5G core (5GC) requests) between a consumer NF and a producer NF after applying application level security protection.

It will be appreciated that FIG. 1 is for illustrative purposes and that various nodes and/or modules, locations, and/or functionality described above in relation to FIG. 1 may be changed, altered, added, or removed.

Figure 2:
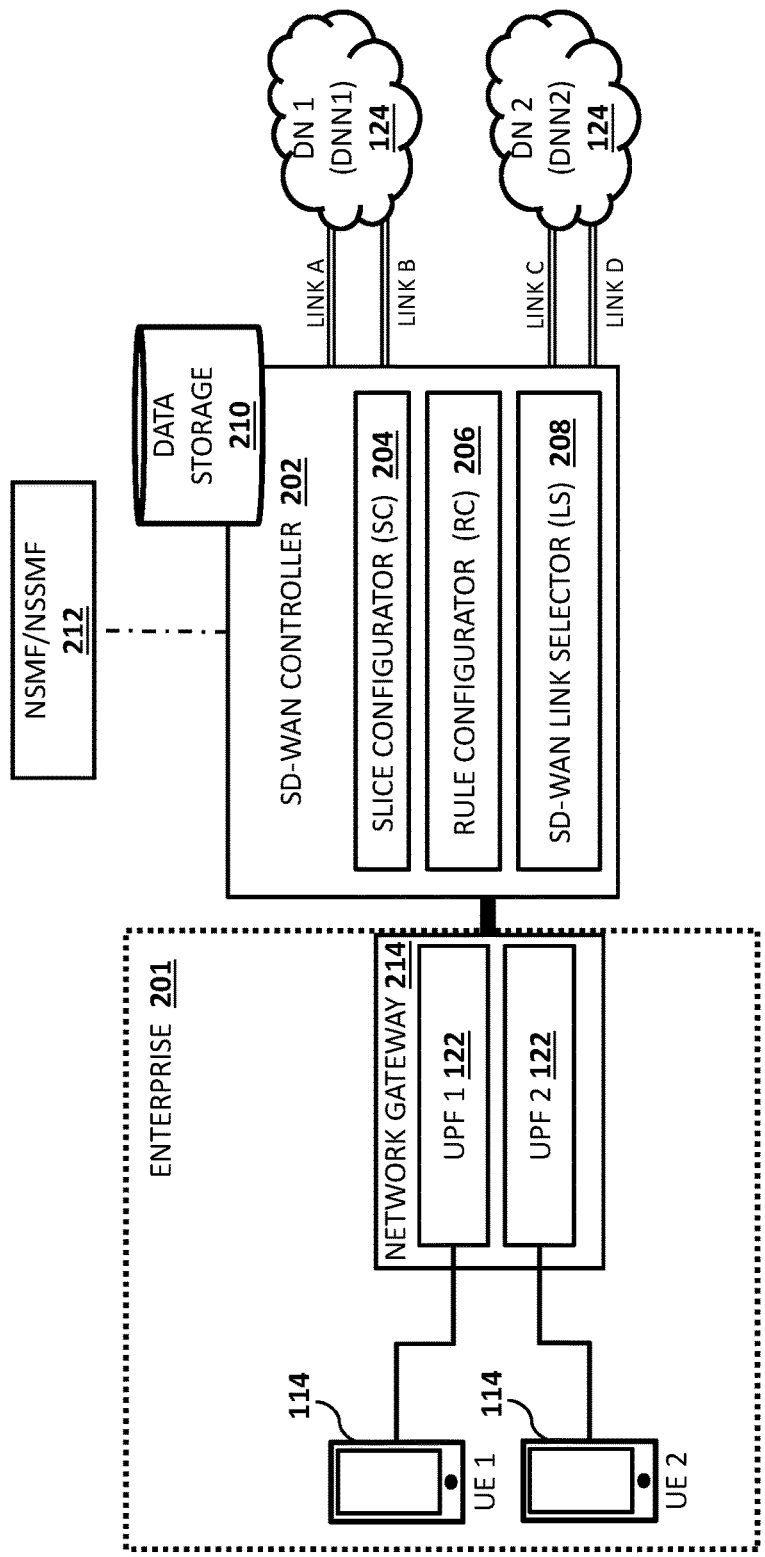
FIG. 2 is a diagram illustrating an example software-defined wide area network (SD-WAN) controller for selecting an SD-WAN link using network slice information.

FIG. 2 is a diagram illustrating an example SD-WAN controller 202 in a communications environment 200. Communications environment 200 may represent one or more networks, including, for example, an enterprise network 201, a transport network, and/or a 5G communications network comprising a network slice management function and/or a network slice subnet management function (NSMF/NSSMF) 212.

In some embodiments, enterprise network 201 may include an adaptive private network (APN) and/or a service provider network. For example, enterprise network 201 may represent various network nodes, equipment, and user devices associated with an administrative domain. In this example, enterprise network 201 may use SD-WAN technology, SD-WAN links, and related equipment (e.g., network gateway 214 and/or UPFs 122) to connect UEs 114 to various sites or networks, e.g., a data network (DN) 1 124 (also referred to herein as DNN1) and a DN 2 124 (also referred to herein as DNN2).

In some embodiments, enterprise network 201 may include a 5G communications network and/or related 5G NFs. For example, as depicted in FIG. 2, enterprise network 201 may include an UPF 1 and an UPF 2 122 communicatively coupled to UE 1 114 and UE 2 114, respectively. In some embodiments, UPFs 122 may be implemented at a network gateway 214.

Network gateway 214 may be any suitable entity or entities (e.g., software and/or VMs executing on one or more processors in a computing platform) for communicating user traffic between various networks. For example, network gateway 214 or UPFs 122 may send user traffic to SD-WAN controller 202 such that SD-WAN controller 202 can select an SD-WAN link for transmitting one or more traffic flows to a destination, e.g., DNN1 124 or DNN2 124.

SD-WAN controller 202 may represent any suitable entity or entities for performing aspects of selecting an SD-WAN link (e.g., a virtual circuit or a cloud conduit for connecting networks) using network slice information or information derived from network slice information. In some embodiments, SD-WAN controller may be located in a transport network between enterprise network 201 and one or more other networks or sites (e.g., a remote local area network (LAN) associated with enterprise network 201).

SD-WAN controller 202 may include various functionality for performing one or more aspects of routing, managing, or controlling SD-WAN traffic via adding, changing or deleting SD-WAN routing data, link selection rules, or various selection criteria. In some embodiments, in contrast to deep packet inspection (DPI) techniques which may require significant overhead and/or processing delays to identify or classify received packets before selecting an appropriate SD-WAN link, SD-WAN controller 202 may be capable of mapping packet header information to packet transmission characteristics (e.g., transmission requirements or preferences) and using those mappings or related information (e.g., link selection rules informed by the packet transmission characteristics) to perform SD-WAN link selection. In such embodiments, the packet transmission characteristics may be based on or derived from 5G network slice information that indicates network slice characteristics. For example, SD-WAN controller 202 or a related entity (e.g., a slice configurator (SC) 204) may communicate with or subscribe to a 5GC NF (e.g., NSMF/NSSMF 212) to receive network slice information after a network slice is created. In this example, SD-WAN controller 202 or the related entity may analyze and/or parse received network slice information for each network slice to identify packet header information (e.g., a set or pool of UE IP addresses) and transmission characteristics (e.g., bandwidth, latency, jitter, etc.) associated with that network slice.

SD-WAN controller 202 may include or be communicatively coupled to SC 204. SC 204 may be any suitable entity (e.g., software executing on at least one processor) for performing one or more aspects associated with receiving network slice information from a 5GC NF or a network slice manager, e.g., NSMF/NSSMF 212. For example, SC 204 may authenticate itself with NSMF/NSSMF 212 or a related 5G network so as to appear to NSMF/NSSMF 212 as an authorized management service consumer. In this example, SC 204 may subscribe to network slice information (e.g., a network slice information provisioning data report) by sending a subscribe message (e.g., using a subscribe managed object instance (MOI)) to NSMF/NSSMF 212. Continuing with this example, assuming the subscription request is successful, SC 204 may receive network slice information via a notification message (e.g., using a notify MOI) after a network slice is created. In some embodiments, SC 204 may extract various packet related characteristics from the received network slice information and may correlate and store this information (e.g., a pool of UE IP addresses, a DNN, a VLAN ID, bandwidth requirements, and/or latency requirements) in a data store (e.g., in data storage 210) and/or may send this information or related information to another entity, e.g., RC 206.

SD-WAN controller 202 may include or be communicatively coupled to a rule configurator 206. RC 206 may be any suitable entity (e.g., software executing on at least one processor) for performing one or more aspects associated with generating or updating a policy or rule data store (e.g., rules data structure or rules table). For example, RC 206 may receive extracted network slice information (e.g., a pool of UE IP addresses, a DNN, a VLAN ID, bandwidth requirements, and/or latency requirements) from SC 204 and may use this information to reconfigure or module link selection rules. For example, link selection rules may be updated such that relevant UE IP addresses are associated with bandwidth and latency requirements derived or obtained from the received network slice information. SD-WAN controller 202 may include or be communicatively coupled to a link selector (LS) 208. LS 208 may be any suitable entity (e.g., software executing on at least one processor) for performing one or more aspects associated with selecting an appropriate SD-WAN for transmitting received packets, e.g., originating from UE 1 114 or UE 2 114. For example, LS 208 may receive a packet and may read, e.g., using shallow packet inspection, a source IP address and a destination IP address and/or other packet header information and then may use this information to match a corresponding link selection rule from a rule data store, e.g., based on link characteristics and packet transmission requirements. In this example, LS 208 may select an appropriate (e.g., an optimal) SD-WAN link for transmitting the packet onward to a destination, e.g., DNN1 124 or DNN2 124.

SD-WAN controller 202 or related entities (e.g., SC 204, RC 206, or LS 208) may access (e.g., read from and/or write information to) data storage 210. Data storage 210 may be any suitable entity (e.g., a computer readable medium or memory) for storing various data associated with selecting an SD-WAN link for transmitting received packets, including, for example, network slice information, service profile related information, routing or forwarding rule information, link selection rule information, and/or other data.

It will be appreciated that FIG. 2 and its related description are for illustrative purposes and that SD-WAN controller 202 or related entities may include additional and/or different modules, components, or functionality. For example, SC 204, RC 206, and LS 208 may be merged into a combined module.

FIG. 3 is a diagram illustrating example service profile related information 300 associated with a plurality of 5G network slices. In some embodiments, information 300 may be compiled and/or accessed by various entities (e.g., SD-WAN controller 202 or related modules) in environment 200. For example, SC 204 may receive and analyze messages (e.g., notify MOI messages) containing network slice information (e.g., a 5G network resource model (NRM) network slice service profile) from NSMF/NSSMF 212. In this example, SC 204 may identify associations between UE IP addresses and network slice characteristics and may store this information in a data store (e.g., in data storage 210) and/or may send this information or related information to one or more entities, e.g., RC 206 and/or LS 208.

Referring to FIG. 3, a table representing information 300 comprises columns and/or fields for slice UE IP addresses and slice transmission characteristics (e.g., requirements). A slice UE IP addresses field may store information for representing a group or pool of IP addresses for UEs that can utilize a particular network slice. For example, the first data row of the table of FIG. 3 indicates a slice UE IP addresses field value "UE IP RANGE 'A'". In this example, the slice UE IP addresses field value "UE IP RANGE 'A'" may represent a range of IP addresses, e.g., 172.16.254.1-172.16.254.255. In another example, a slice UE IP addresses field value "UE IP RANGE 'B'" may represent a different range of IP addresses, e.g., 173.24.234.1-173.24.234.155.

A slice transmission characteristics field may store slice requirements or other information, e.g., service profile information. Example slice transmission characteristics may include PerfReq attribute information, a DNN, a VLAN ID, an IP packet range, an upload bandwidth requirement, a download bandwidth requirement, an application latency requirement, an expected end-to-end latency requirement, a jitter requirement, an availability requirement, a reliability requirement, a data rate requirement, a payload size requirement, a traffic density requirement, a connection density requirement, or a service area dimension requirement. For example, the first data row of the table of FIG. 3 indicates a slice transmission characteristics field value "BANDWIDTH 'Y', JITTER 'X', APP LATENCY 'V'". In this example, the service slice transmission characteristics field value 'BANDWIDTH 'Y', JITTER 'X', APP LATENCY 'V'" may represent a particular bandwidth requirement, jitter requirement, and application latency requirement associated with a network slice. In another example, the second data row of the table of FIG. 3 indicates a slice transmission characteristics field value "E2E LATENCY 'R'", where this value may represent a particular expected end-to-end latency requirement associated with a different network slice.

In some embodiments, an IP addresses of a packet received by SD-WAN controller 202 or a related entity (e.g., UPF 1 122 or UPF 2 122) may be usable for identifying a related 5G data slice and/or its related slice transmission characteristics or requirements. For example, SD-WAN controller 202 or another entity may determine an IP address range that includes the source IP address of a packet for SD-WAN link transmission. In this example, by identifying an UE IP address range, SD-WAN controller 202 or another entity may determine corresponding transmission characteristics and may use the transmission characteristics when selecting an appropriate SD-WAN link.

It will also be appreciated that information 300 is for illustrative purposes and that different and/or additional data than the data depicted in FIG. 3 may be usable for SD-WAN link selections. Further, information 300 may be stored (e.g., in data storage 210) and managed using various data structures and/or computer readable media.

FIG. 4 is a diagram illustrating example SD-WAN link information 400. In some embodiments, SD-WAN controller 202 or another entity (e.g., RC 206 or LS 208) may use telemetry information, visibility information, and/or link related metrics to derive current or expected link characteristics associated with various SD-WAN links (e.g., Links A-D in FIG. 2). For example, periodically or aperiodically, SD-WAN controller 202 or another entity (e.g., RC 206 or LS 208) may generate ore receive link performance metrics and may use this information to generate or compile and store information 400. In this example, SD-WAN controller 202 or another entity may use information 400 when selecting an appropriate SD-WAN link that can meet or is most likely to meet packet related transmission requirements, e.g., by comparing information 400 and a packet's transmission requirements (e.g., based on network slice characteristics related to the packet) and selecting an SD-WAN link that can meet or exceed the packet's transmission requirements.

Referring to FIG. 4, a table representing information 400 comprises columns and/or fields for link names, bandwidth values, latency values, loss values, and jitter values. A link name field may store information for indicating a particular SD-WAN link. For example, the first data row of the table of FIG. 4 indicates a link name field value 'Link A' representing a first SD-WAN link and the second data row of the table of FIG. 4 indicates a link name field value 'Link B' representing a second, different SD-WAN link.

A bandwidth field may store information for representing an upload link bandwidth value and/or a download link bandwidth value associated with an SD-WAN link. For example, the first data row of the table of FIG. 4 indicates a service name field value "UL1/DL1". In this example, the service name field value "UL1/DL1" may represent a particular upload link bandwidth value (e.g., 150 megabits per seconds (Mbps)) and a particular download link bandwidth value (e.g., 50 Mbps) associated with "Link A".

A latency field may store information for representing a latency value associated with an SD-WAN link. For example, the first data row of the table of FIG. 4 indicates a latency field value "Latency 1". In this example, the latency field value "Latency 1" may represent a particular latency value (e.g., a delay of 50 milliseconds (ms)) associated with "Link A". In another example, the second data row of the table of FIG. 4 indicates a latency field value "Latency 2", where this value may represent a different latency value (e.g., 320 ms) associated with associated with "Link B".

A loss field may store information for representing a packet loss value (e.g., a packet loss rate like packets per second (p/s)) associated with an SD-WAN link. For example, the first data row of the table of FIG. 4 indicates a loss field value "Loss 1". In this example, the loss field value "Loss 1" may represent a particular loss value (e.g., 10 p/s) associated with "Link A".

A jitter field may store information for representing a jitter value (e.g., a value indicating packet delay variation) associated with an SD-WAN link. For example, the first data row of the table of FIG. 4 indicates a jitter field value "Jitter 1". In this example, the jitter field value "Jitter 1" may represent a particular jitter value (e.g., 15 ms) associated with "Link A".

It will also be appreciated that information 400 is for illustrative purposes and that different and/or additional data than the data depicted in FIG. 4 may be usable for SD-WAN link selections. Further, information 400 may be stored (e.g., in data storage 210) and managed using various data structures and/or computer readable media.

FIG. 5 is a diagram illustrating example SD-WAN selection information 500. In some embodiments, SD-WAN controller 202 or another entity (e.g., RC 206 or LS 208) may compile, store, and/or use SD-WAN selection information 500. In some embodiments, SD-WAN selection information 500 may include network slice information or information derived from or based on network slice information. For example, SD-WAN controller or another entity (e.g., LS 208) may use packet header information obtained from a received packet to determine an appropriate link selection rule for selecting an appropriate SD-WAN link and/or may use the packet header information to determine an appropriate SD-WAN link (e.g., when a previously related packet in a packet flow already is using that SD-WAN link).

In some embodiments, SD-WAN selection information 500 may be used in a routing data structure or for various route related decisions. For example, after an initial discovery for an appropriate SD-WAN link, SD-WAN controller 202 or another entity (e.g., LS 208) may associated the SD-WAN link with the packet header information and, unless the link is unavailable or becomes congested, SD-WAN controller 202 or another entity (e.g., LS 208) may lookup the SD-WAN link in SD-WAN selection information 500, thereby bypassing a link selection process or a related link rule determination and/or packet characteristics determination.

Referring to FIG. 5, a table representing information 500 comprises columns and/or fields for packet header information, link selection rules, and selected SD-WAN links. A packet header information field may store packet header information usable for indicating a packet or a related group of packets associated with a link selection rule and/or a selected SD-WAN link. For example, the first data row of the table of FIG. 5 indicates a packet header information field value "SOURCE IP '5' DEST IP '1'". In this example, the packet header information field value "SOURCE IP '5' DEST IP '1'" may represent a particular source IP address and a particular destination IP address that indicates a first group of related packets. In another example, the second data row of the table of FIG. 5 indicates a packet header information field value "VLAN '2', DEST IP '1'", where this value may represent a particular VLAN ID and a particular destination IP address that indicates a second group of related packets.

A link selection rule field may store information for indicating a particular link selection rule usable for selecting an SD-WAN link. For example, the first data row of the table of FIG. 5 indicates a link selection rule field value 'RULE 1' representing a particular link selection rule, e.g., a rule that uses a particular set or subset of a packet's characteristics (e.g., destination IP address, jitter requirements, latency requirements, and bandwidth requirements) or a prioritization of the packet's characteristics (e.g., (e.g., (1) destination IP address, (2) bandwidth requirements, (3) latency requirements, and (4) jitter requirements) to determine the most suitable available SD-WAN link.

A selected SD-WAN link field may store information for indicating a particular SD-WAN link to use. For example, the first data row of the table of FIG. 5 indicates a selected SD-WAN link field value 'Link A' representing a first SD-WAN link and the second data row of the table of FIG. 4 indicates a selected SD-WAN link field value 'Link B' representing a second, different SD-WAN link.

It will also be appreciated that information 500 is for illustrative purposes and that different and/or additional data than the data depicted in FIG. 5 may be usable for SD-WAN link selections. Further, information 500 may be stored (e.g., in data storage 210) and managed using various data structures and/or computer readable media.

Figure 6:
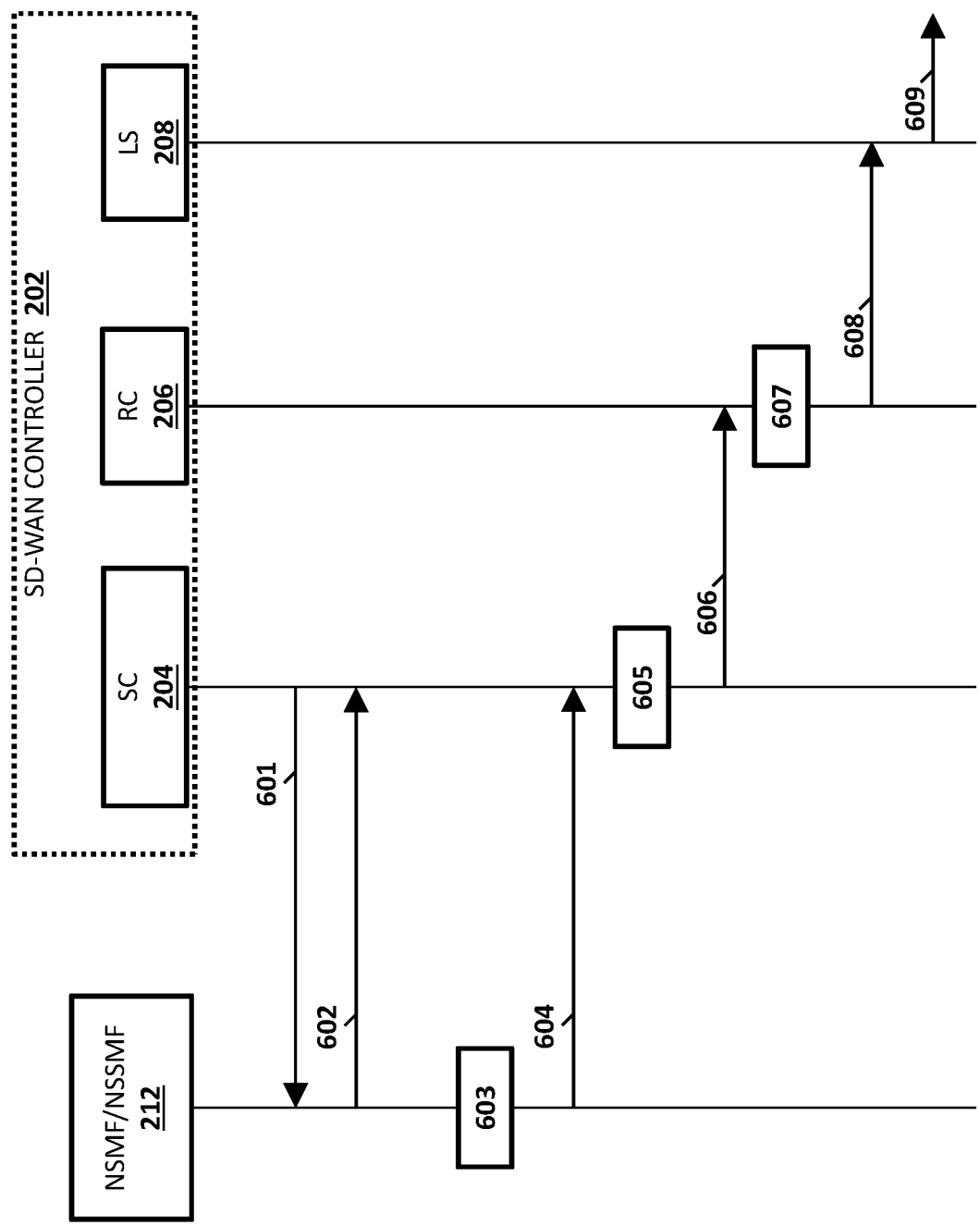
FIG. 6 is a message flow diagram illustrating example interactions with an SD-WAN controller.

FIG. 6 depicts a message flow diagram illustrating interactions associated with SD-WAN controller 202. In some embodiments, SD-WAN controller 202 may include or may be communicatively coupled to SC 204 In such embodiments, SD-WAN controller 202 and/or SC 204 may communicate with one or more 5G NFs to receive network slice information and may use transmission requirements indicated by the network slice information in determining which SD-WAN link to use for transmitting received packets to a data network, e.g., DNN1 124 and DNN2 124.

Referring to FIG. 6, in step 601, SC 204 may send a subscription request to receive network slice information (e.g., a NSI provisioning data report) from NSMF/NSSMF 212 (e.g., via a subscribe MOI). For example, SC 204 may subscribe to NSMF/NSSMF 212 (e.g., using an IP address of NSMF/NSSMF 212) and may act or appear to NSMF/NSSMF 212 as a management service consumer.

In step 602, NSMF/NSSMF 212 may send a response message indicating that the subscription request was successful.

In step 603, a network slice may be created (e.g., using NSSF 116) and a slice creation trigger or indicator may be sent to NSMF/NSSMF 212.

In step 604, NSMF/NSSMF 212 may send network slice information to SC 204 (e.g., via a notify MOI). For example, a notify MOI may include a service profile data type including PerfReq attribute information and latency attribute information, a DNN, a VLAN ID, and a UE IP address pool.

In some embodiments, PerfReq attribute information may include upload bandwidth requirement and download bandwidth requirement, e.g., for enhanced mobile broadband (eMBB) slices.

In some embodiments, PerfReq attribute information may include a jitter requirement and an application latency requirement, e.g., for ultrareliable low latency communication (URLLC) slices.

In step 605, SC 204 may extract or obtain various information from the network slice information and may use this information (e.g., PerfReq attribute information and latency attribute information, bandwidth requirement(s), a DNN, a VLAN ID, and/or a UE IP address pool) to generate or modify a link selection rule information.

In step 606, SC 204 may send link selection rule information to RC 206 or update a related data store.

In step 607, RC 206 may receive a packet from a UPF (or network gateway 214) and may determine a link selection rule using packet header information associated with the packet. For example, RC 206 may use shallow packet inspection to obtain packet header information (e.g., a source IP address and a destination IP address) associated with the packet. In this example, RC 206 may use the packet header information to identify corresponding transmission characteristics associated with packet (and a related network slice).

In step 608, RC 206 may forward the packet to LS 208 along with transmission characteristics (e.g., bandwidth and latency requirements) associated with the packet.

In step 609, LS 208 may select an SD-WAN link using the transmission characteristics (e.g., bandwidth and latency requirements) associated with the packet. In some embodiments, an SD-WAN link is selected based on a link selection rule associated with derived transmission characteristics associated with a packet and based on current link characteristics (e.g., available link bandwidth or expected latency based on known or obtainable link metrics).

It will be appreciated that FIG. 6 is for illustrative purposes and that different and/or additional messages and/or actions may be used. It will also be appreciated that various messages and/or actions described herein may occur in a different order or sequence.

Figure 7:
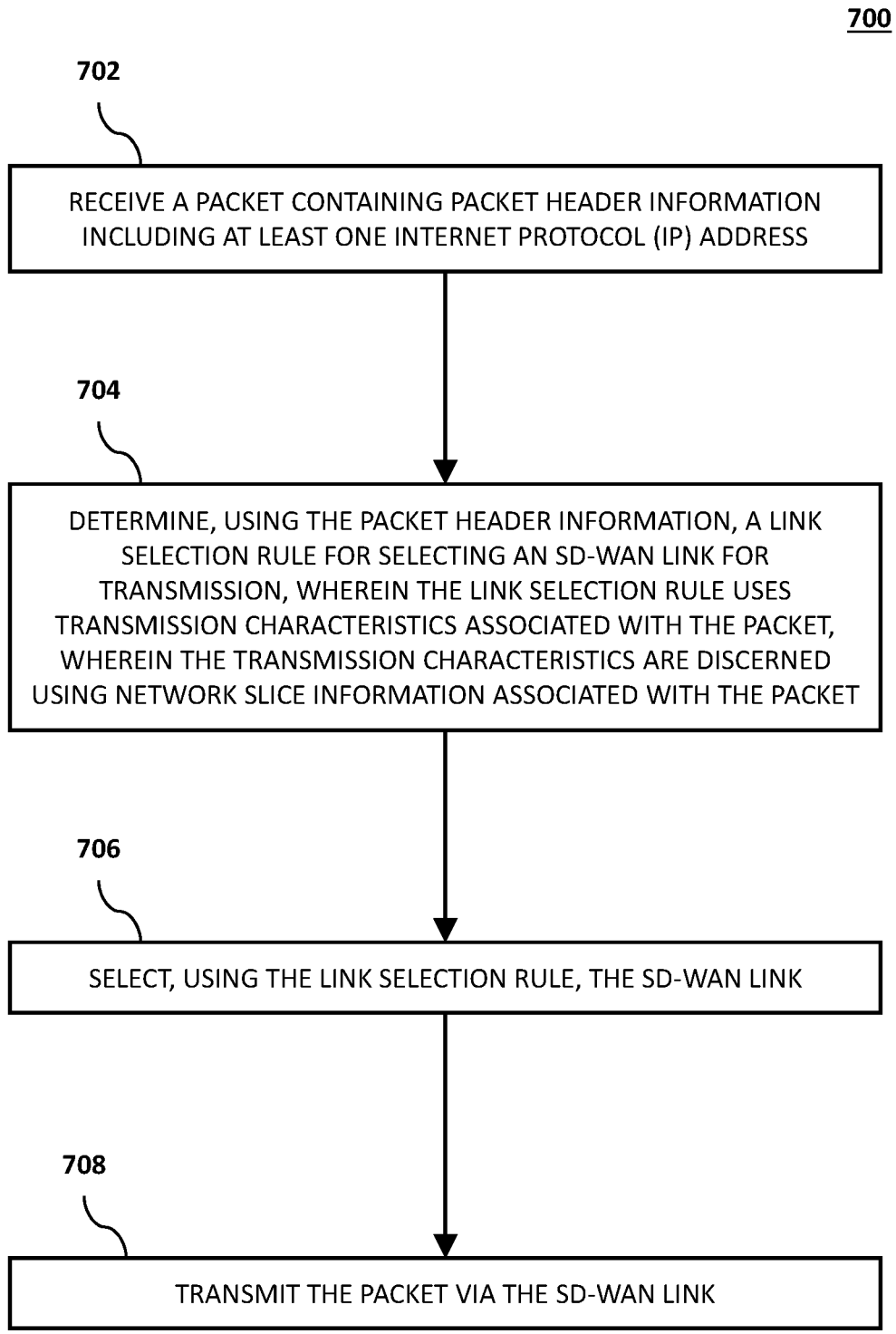
FIG. 7 is a flow chart illustrating an example process for selecting an SD-WAN link using network slice information.

FIG. 7 is a message flow diagram illustrating an example process 700 for selecting an SD-WAN link using network slice information. In some embodiments, example process 700 described herein, or portions thereof, may be performed at or performed by SD-WAN controller 202, SC 204, RC 206, LS 208, and/or another module or node.

Referring to process 700, in step 702, a packet containing at least one IP address may be received. For example, a data packet may be received from UE 1 114 meant for DNN1 124 and may include a source IP address 'A' and a destination IP address 'B'.

In step 704, it may be determined, using the packet header information, a link selection rule for selecting an SD-WAN link for transmission, wherein the link selection rule uses transmission characteristics associated with the packet, wherein the transmission characteristics are discerned using network slice information associated with the packet. For example, SD-WAN controller 202 and/or related entities (e.g., SC 204 and/or RC 206) may compile, using network slice information (e.g., service profile information) obtained from NSMF/NSSMF 212, a data store comprising a plurality of records indicating associations between UE IP addresses (e.g., a group of UE IP addresses) and appropriate link selection rules. In this example, each link selection rule may identify an SD-WAN link as optimal or appropriate for transmitting a packet if the SD-WAN link can currently support transmission characteristics associated with a network slice from which the packet originates.

In step 706, the SD-WAN link may be selected using the link selection rule. For example, SD-WAN controller 202 may select a link selection rule that uses a destination IP address and a VLAN ID in a packet along with transmission characteristics associated with the packet to identify an appropriate link.

In some embodiments, an SD-WAN link may be selected using link measurement information. For example, SD-WAN controller 202 may attempt to select an SD-WAN link based on current load and/or an expected latency or may be selected by determining that an expected bandwidth needed by the packet is available.

In step 708, the packet may be transmitted via the SD-WAN link.

In some embodiments, SD-WAN controller 202 or a second entity (e.g., SC 204) communicatively coupled to SD-WAN controller 202 may be configured for: prior to receiving the packet: subscribing, to a network slice manager, to receive notification for a network slice information provisioning data report via a subscribe MOI; after a network slice is created, receiving, from the network slice manager, the network slice information provisioning data report via a notify MOI, wherein the notify MOI includes the network slice information; and using the network slice information to generate or update a record in a data store indicating an association between one or more IP addresses associated with the network slice and transmission characteristics associated with the network slice.

In some embodiments, a data store may comprise a plurality of records indicating associations between IP addresses and transmission characteristics, wherein each of the associations is based on a different network slice. For example, network slice information 300 may indicate slice characteristics for a plurality of 5G network slices.

In some embodiments, SD-WAN controller 202 or a second entity (e.g., SC 204) communicatively coupled to SD-WAN controller 202 may be registered with a network slice manager (e.g., NSMF/NSSMF 212) as an authorized management service consumer.

In some embodiments, the network slice manager may include an NSSMF, an NSSMF, a CSMF, or a 5G NF.

In some embodiments, network slice information may include service profile information. In such embodiments, the service profile information may include PerfReq attribute information, a DNN, a VLAN ID, an IP packet range, an upload bandwidth requirement, a download bandwidth requirement, an application latency requirement, an expected end-to-end latency requirement, a jitter requirement, an availability requirement, a reliability requirement, a data rate requirement, a payload size requirement, a traffic density requirement, a connection density requirement, or a service area dimension requirement.

In some embodiments, determining a link selection rule may include performing shallow packet inspection of an IP header of a packet to obtain packet header information.

In some embodiments, a packet for transmission via a selected SD-WAN link may be received from or originate from a fifth generation (5G) communications network.

It will be appreciated that process 700 is for illustrative purposes and that different and/or additional messages and/or actions may be used. It will also be appreciated that various messages and/or actions described herein may occur in a different order or sequence.

It will be appreciated that while some aspects of the subject matter described herein has been discussed with reference to 5G networks various other networks may utilize some aspects of the subject matter described herein. For example, any network that utilizes network slicing and provides mechanisms for obtaining network slice information may use features, mechanisms, and techniques described herein to select an SD-WAN link using network slice information.

It should be noted that SD-WAN controller 202, SC 204, and/or functionality described herein may constitute a special purpose computing device. Further, SD-WAN controller 202, SC 204, and/or functionality described herein can improve the technological field of SD-WAN controllers and related functionality. For example, by discerning transmission characteristics of a packet using packet header information (e.g., wherein the packet header information indicates particular transmission characteristics of a network slice associated with the packet), SD-WAN controller 202 can select an appropriate SD-WAN link for transmission of the packet.

In some embodiments, aspects of the present subject matter provides one or more of the following benefits: a mechanism or technique to dynamically identify slice characteristics (e.g., transmission characteristics) usable in selecting an appropriate SD-WAN link; a mechanism or technique for determining per UE throughput and latency requirement usable in selecting an appropriate SD-WAN link and usable for maintaining a desired QoS level; a mechanism or technique to identify UE data packets profiles (e.g., packet size, packets per seconds, etc.) usable in selecting an appropriate SD-WAN link; increases overall performance of an SD-WAN because SD-WAN link selection is performed using shallow packet inspection instead of deep packet inspection; and/or improves overall automation capabilities and performance of an SD-WAN by providing slice awareness in an SD-WAN controller thereby reducing the need for manual provisioning of traffic types and related detection rules.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 28.531; $3^{rd}$ Generation Partnership Project; Technical Specification Group Core Group Services and System Aspects; Management and orchestration; Provisioning; (Release 16), V16.8.0 (2020-12).
2. 3GPP TS 28.541; $3^{rd}$ Generation Partnership Project; Technical Specification Group Services and System Aspects; Management and orchestration; 5G Network Resource Model (NRM); Stage 2 and stage 3 (Release 17), V17.1.0 (2020-12).

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for selecting a software defined wide area network (SD-WAN) link using network slice information, the method comprising:
   at a software defined wide area network (SD-WAN) controller implemented using at least one processor or a second entity communicatively coupled to the SD-WAN controller and prior to receiving a packet:
      subscribing, to a network slice manager, to receive notification for a network slice information provisioning data report via a subscribe managed object instance (MOI);
      after a network slice is created, receiving, from the network slice manager, the network slice information provisioning data report via a notify MOI, wherein the notify MOI includes the network slice information; and
      using the network slice information to generate or update a record in a data store indicating an association between one or more IP addresses associated with the network slice and transmission characteristics associated with the network slice; and
   at the SD-WAN controller:
      receiving the packet containing packet header information including at least one internet protocol (IP) address of the one or more IP addresses associated with the network slice;
      determining, using the packet header information, a link selection rule for selecting an SD-WAN link for transmission, wherein determining the link selection rule includes determining, using the at least one IP address, the record indicating the transmission characteristics;
      selecting, using the link selection rule and the transmission characteristics obtained from the record, the SD-WAN link, wherein the link selection rule uses the transmission characteristics to select the SD-WAN link; and
      transmitting the packet via the selected SD-WAN link.

2. The method of claim 1 wherein the record is one of a plurality of records in the data store indicating associations between IP addresses and transmission characteristics, wherein each of the associations is based on a different network slice.

3. The method of claim 1 wherein the SD-WAN controller or the second entity is registered with the network slice manager as an authorized management service consumer.

4. The method of claim 1 wherein the network slice manager includes a network slice management function (NSMF), a network slice subnet management function (NSSMF), a communication service management function (CSMF), or a fifth generation (5G) network function.

5. The method of claim 1 wherein the network slice information includes service profile information.

6. The method of claim 5 wherein the service profile information includes performance requirements (PerfReq) attribute information, a data network name (DNN), a virtual local area network (VLAN) identifier, an IP packet range, an upload bandwidth requirement, a download bandwidth requirement, an application latency requirement, an expected end-to-end latency requirement, a jitter requirement, an availability requirement, a reliability requirement, a data rate requirement, a payload size requirement, a traffic density requirement, a connection density requirement, or a service area dimension requirement.

7. The method of claim 1 wherein determining the link selection rule includes performing packet header inspection of an IP header of the packet to obtain the packet header information.

8. The method of claim 1 wherein the packet is received from or originates from a fifth generation (5G) communications network.

9. A system for selecting a software defined wide area network (SD-WAN) link using network slice information, the system comprising:
   at least one processor;
   a memory; and
   a software defined wide area network (SD-WAN) controller implemented using at least one processor or a second entity communicatively coupled to the SD-WAN controller, wherein the SD-WAN controller or the second entity is configured for:

prior to receiving a packet:
  subscribing, to a network slice manager, to receive notification for a network slice information provisioning data report via a subscribe managed object instance (MOI);
  after a network slice is created, receiving, from the network slice manager, the network slice information provisioning data report via a notify MOI, wherein the notify MOI includes the network slice information; and
  using the network slice information to generate or update a record in a data store indicating an association between one or more IP addresses associated with the network slice and transmission characteristics associated with the network slice; and
  wherein the SD-WAN controller is configured for:
    receiving the packet containing packet header information including at least one internet protocol (IP) address of the one or more IP addresses associated with the network slice;
    determining, using the packet header information, a link selection rule for selecting an SD-WAN link for transmission, wherein determining the link selection rule includes determining, using the at least one IP address, the record indicating the transmission characteristics;
    selecting, using the link selection rule and the transmission characteristics obtained from the record, the SD-WAN link, wherein the link selection rule uses the transmission characteristics to select the SD WAN link; and
    transmitting the packet via the selected SD-WAN link.

10. The system of claim 9 wherein the record is one of a plurality of records in the data store indicating associations between IP addresses and transmission characteristics, wherein each of the associations is based on a different network slice.

11. The system of claim 9 wherein the SD-WAN controller or the second entity is registered with the network slice manager as an authorized management service consumer.

12. The system of claim 9 wherein the network slice manager includes a network slice management function (NSMF), a network slice subnet management function (NSSMF), a communication service management function (CSMF), or a fifth generation (5G) network function.

13. The system of claim 9 wherein the network slice information includes service profile information.

14. The system of claim 13 wherein the service profile information includes performance requirements (PerfReq) attribute information, a data network name (DNN), a virtual local area network (VLAN) identifier, an IP packet range, an upload bandwidth requirement, a download bandwidth requirement, an application latency requirement, an expected end-to-end latency requirement, a jitter requirement, an availability requirement, a reliability requirement, a data rate requirement, a payload size requirement, a traffic density requirement, a connection density requirement, or a service area dimension requirement.

15. The system of claim 9 wherein determining the link selection rule includes performing packet header inspection of an IP header of the packet to obtain the packet header information.

16. The system of claim 9 wherein the packet is received from or originates from a fifth generation (5G) communications network.

17. A non-transitory computer readable medium having stored thereon executable instructions that when executed by at least one processor of at least one computer cause the at least one computer to perform steps comprising:
  at a software defined wide area network (SD-WAN) controller implemented using at least one processor or a second entity communicatively coupled to the SD-WAN controller and prior to receiving a packet:
    subscribing, to a network slice manager, to receive notification for a network slice information provisioning data report via a subscribe managed object instance (MOI);
    after a network slice is created, receiving, from the network slice manager, the network slice information provisioning data report via a notify MOI, wherein the notify MOI includes the network slice information; and
    using the network slice information to generate or update a record in a data store indicating an association between one or more IP addresses associated with the network slice and transmission characteristics associated with the network slice; and
  at the SD-WAN controller:
    receiving the packet containing packet header information including at least one internet protocol (IP) address of the one or more IP addresses associated with the network slice;
    determining, using the packet header information, a link selection rule for selecting an SD-WAN link for transmission, wherein determining the link selection rule includes determining, using the at least one IP address, the record indicating the transmission characteristics;
    selecting, using the link selection rule and the transmission characteristics obtained from the record, the SD-WAN link, wherein the link selection rule uses the transmission characteristics to select the SD-WAN link; and
    transmitting the packet via the selected SD-WAN link.

* * * * *